(12) United States Patent
Strassmann et al.

(10) Patent No.: US 9,213,859 B2
(45) Date of Patent: *Dec. 15, 2015

(54) SECURING USER DATA IN CLOUD COMPUTING ENVIRONMENTS

(71) Applicant: VMware, Inc., Palo Alto, CA (US)

(72) Inventors: Steven Henry Strassmann, Cambridge, MA (US); Zachary James Shepherd, Cambridge, MA (US)

(73) Assignee: VMware, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/549,269

(22) Filed: Nov. 20, 2014

(65) Prior Publication Data

US 2015/0082416 A1    Mar. 19, 2015

Related U.S. Application Data

(63) Continuation of application No. 13/734,240, filed on Jan. 4, 2013, now Pat. No. 8,910,297.

(60) Provisional application No. 61/583,316, filed on Jan. 5, 2012.

(51) Int. Cl.
  *H04L 29/06*   (2006.01)
  *G06F 21/62*   (2013.01)
  *G06F 21/60*   (2013.01)
  *H04L 29/08*   (2006.01)

(52) U.S. Cl.
  CPC ............ *G06F 21/6218* (2013.01); *G06F 21/60* (2013.01); *H04L 63/0281* (2013.01); *H04L 63/0428* (2013.01); *H04L 63/101* (2013.01); *H04L 63/168* (2013.01); *H04L 67/2871* (2013.01)

(58) Field of Classification Search
  CPC ...... G06F 21/121; G06F 21/128; G06F 21/53
  See application file for complete search history.

(56) References Cited

U.S. PATENT DOCUMENTS 7,832,012 B2 * 11/2010 Huddleston ..................... 726/24
2012/0066769 A1 * 3/2012 Latchem et al. ................. 726/26

* cited by examiner

Primary Examiner — Edward Zee

(57) ABSTRACT

Systems and methods for obfuscating user data in a remote web-based application are disclosed. According to one method, user inputs to a displayed web page of the remote web-based application are received at a first web browser that is used by the user, wherein at least a portion of the user inputs comprise user-inputted data intended to be stored at the web-based application. The user inputs are transmitted to a management component that is configured to interact with a second web browser that communicates with the web-based application. The management component obfuscates at least a portion of the user-inputted data and forwards the obfuscated and un-obfuscated portions of the user inputs to the second web browser, which correspondingly transmits the obfuscated and un-obfuscated portions of the user inputs to the remote web-based application.

19 Claims, 6 Drawing Sheets

| Unique Identifier | Secure Text | Access Control |
|---|---|---|
| XL5-PGQ5-DdMq7 | Doe suffers from dementia | Doctor |

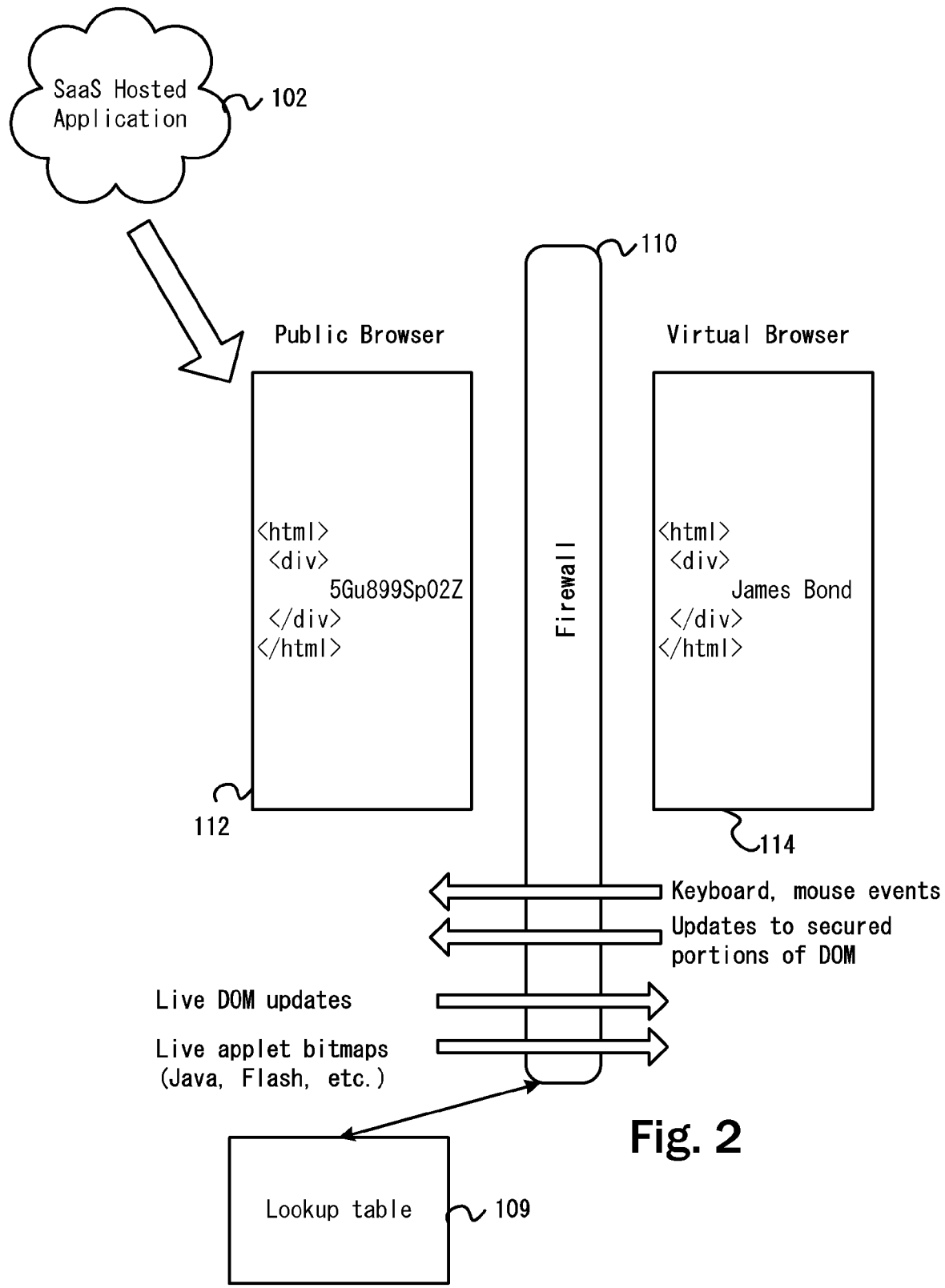

SECURING USER DATA IN CLOUD COMPUTING ENVIRONMENTS

CLAIM OF PRIORITY

This application is a continuation application of U.S. patent application Ser. No. 13/734,240 filed on Jan. 4, 2013 and entitled "Securing User Data In Cloud Computing Environments issued as U.S. Pat. No. 8,910,297, which claims priority to U.S. Provisional Patent Application No. 61/583, 316 filed on Jan. 5, 2012 and entitled "Securing User Data In Cloud Computing Environment", each of which is hereby incorporated by reference herein in its entirety.

BACKGROUND

"Software as a service" ("SaaS") generally describes a software application delivery model in which businesses (sometimes referred herein as "SaaS providers") run software applications and maintain related customer data within their own premises and make the software applications available to remote customers over the Internet. Often, such a SaaS application takes the form of a web application that is accessed over a traditional web browser. One example of a set of SaaS applications that is accessed through traditional web browsers is Google Docs, which provides online versions of word processing, spreadsheet and presentation applications that are traditionally locally installed and executed on an end user's personal computer.

Generally, the adoption by enterprises of SaaS applications has been limited to applications that do not require storage of critical or sensitive data or information at the SaaS provider. Enterprises continue to be wary of the possibility that any sensitive data or information that they store at a SaaS provider can be compromised since the enterprises themselves do not have close control over the security measures taken by the SaaS provider to protect customer data from accidental, forced or unintentional unauthorized access. As such, there exists a need for a mechanism to address such customer reluctance to utilize SaaS providers for services or applications relating to sensitive data.

SUMMARY

One or more embodiments provide system and methods securing user data stored at SaaS applications. Techniques disclosed herein move the mechanism for securing the user data from the service provider's remote servers to the user's local computers (presumably within the enterprise's secured premises). According to one method, user inputs to a displayed web page of the remote web-based application are received at a first web browser that is used by the user, wherein at least a portion of the user inputs comprise user-inputted data intended to be stored at the web-based application. The user inputs are transmitted to a management component that is configured to interact with a second web browser that communicates with the web-based application. The management component obfuscates at least a portion of the user-inputted data and forwards the obfuscated and un-obfuscated portions of the user inputs to the second web browser, which correspondingly transmits the obfuscated and un-obfuscated portions of the user inputs to the remote web-based application.

BRIEF DESCRIPTION OF THE DRAWINGS

FIG. 2 illustrates a schematic diagram of a system for securing user data using a private browser in accordance with one or more embodiments;

DETAILED DESCRIPTION

Figures 1A, 1B:
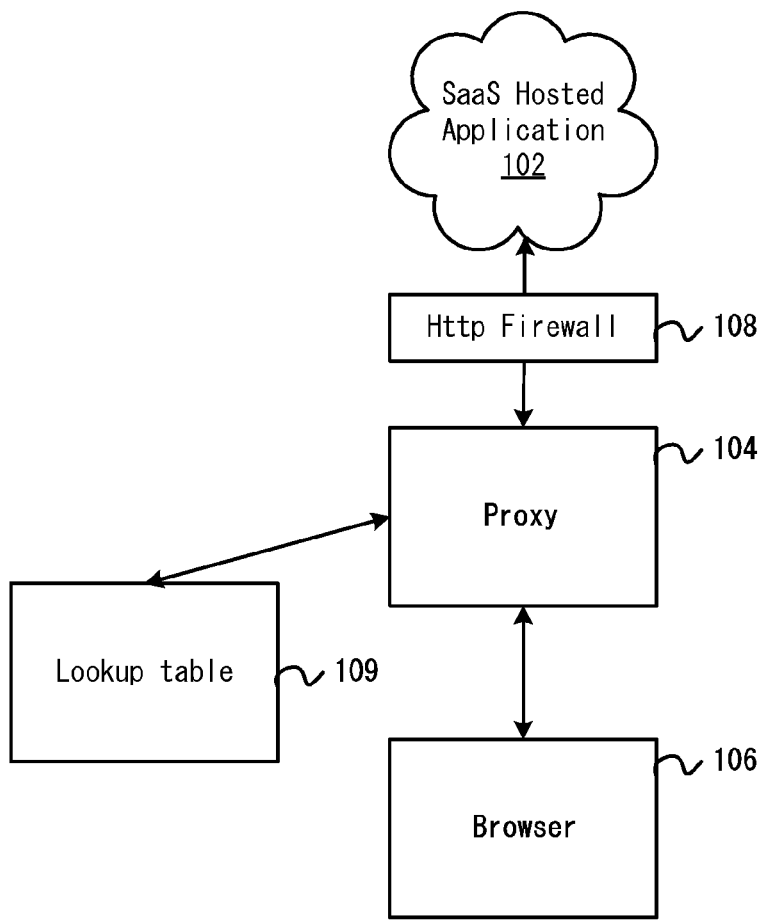
FIG. 1A illustrates a logical diagram of system for securing user data using a proxy server in accordance with one or more embodiments.
FIG. 1B illustrates an exemplary lookup table in accordance with one or more embodiments.

FIG. 1A illustrates a logical diagram of a system 100 for securing user data using a proxy server 104 that serves as an intermediary between a browser 106 and a SaaS application 102. In one embodiment, browser 106 may be a traditional web browser (e.g., Firefox, Internet Explorer, Safari, Chrome, etc.) that is installed on an employee's laptop, desktop or other computer terminal within the premises of the employee's enterprise. In such an embodiment, the employee (or IT administrator of the enterprise) may install a "plug-in," "control" or other similar technology into browser 106 that enables the employee to mark/unmark data displayed in a SaaS application on browser 106 as confidential. For example, if the SaaS application is a spreadsheet application, such a plug-in may cause a context menu to be displayed in browser 106 whenever the employee right-clicks on a field of data so that the employee can annotate or mark such data as confidential or non-confidential.

In the embodiment of FIG. 1A, the employee (or IT administrator of the enterprise) may further configure browser 106 to utilize a proxy server 104 (e.g., running within the enterprise) in order to access the Internet. The employee's indication of whether displayed data is confidential or non-confidential (e.g., via the plug-in) may then be transmitted to proxy server 104 and data communication between browser 106 and SaaS hosted application 102 may generally flow through proxy 104.

As shown in the embodiment of FIG. 1A, proxy server 104 is situated on the user side of firewall 108 between the browser 106 and SaaS hosted application 102. In one scenario, for example, a user accesses SaaS application 102 through browser 106 while working within the enterprise, which has set up proxy 104 and firewall 108 within the enterprise. In an alternative scenario, the user accesses SaaS application 102 through browser 106 on a laptop or other portable computing device when working remotely, but through a virtual private network (VPN) connection to the enterprise such that proxy 104 and firewall 108 are still accessed when browser 106 is used. When the user accesses SaaS hosted application 102 through browser 106, user data maintained by SaaS hosted application 102 flows from SaaS hosted application 102 through proxy 104 to browser 106. When the user views the user data in browser 106, he/she may mark selected parts of it with an annotation that designates it as confidential (although as previously noted, embodiments may further enable an IT administrator to also make such annotations). In one embodiment, as previously discussed, the user uses a plug-in installed in the browser 106 to mark the data as confidential. The user may add annotations to unmarked data or remove annotations from marked data. When the user annotates data as confidential, the plug-in marks such data in a manner that proxy 104 encrypts or otherwise obfuscates such data prior to forwarding the data to SaaS application 102. Similarly, when the user unmarks data that was previously annotated as confidential, proxy 104 passes the data in un-obfuscated form to SaaS application 102, which, in turn, replaces the previously obfuscated data with the un-obfuscated data. The user may choose to leave some data in an un-obfuscated form, for example, so that SaaS application 102 may run data processing or business logic operations (e.g., indexing, searching, tabulating, averaging, etc.) on it.

In one embodiment, the plug-in and proxy 104 may enable the user to select different levels of confidentiality for selected parts of user data. The user may map these levels of confidentiality to corporate user authorizations and/or role management schemes/policies. For example, based on their level of authorization, some users may see some data but not all of the data. In one embodiment, the annotation tags may include user roles to ensure that only the users with appropriate roles can view and/or edit the selected user data. For example, if some particular user data relates to confidential personnel records such as salary data of employees, the user may annotate it with higher authorization roles. In this case, even though some users may see the less confidential user data of a particular employee, the salary data (for example) may only be accessible to selected users with appropriate selected roles and authorizations.

In one embodiment, the plug-in may mark all or portions of user data as secret by adding special tags around the marked data. These annotation tags may appear as parts of the user data to SaaS hosted application 102. However, when the annotated user data is displayed in browser 106, the browser plug-in may hide the annotation tags. Alternatively, the annotation tags may be displayed to users to identify the parts of the user data that were marked secret. Alternatively, the browser plug-in may hide the annotation tags but provide some visual indication (e.g., color coding of displayed text) that portions of the user data have been marked confidential.

In another embodiment, proxy 104 may remove the annotation tags before the user data is displayed in the Internet browser 104. In this embodiment, proxy 104 may maintain a list of which document object model ("DOM") or display elements were stripped of annotation tags. When proxy 104 transmits updated user data back to SaaS application 102, proxy 104 can use this list to determine which elements to obfuscate. Alternatively, proxy 104 may determine which user data to obfuscate data based on a policy. For example, proxy 104 may be configured to automatically obfuscate data contained in selected types of display or DOM elements.

As previously discussed, in certain embodiments, when user data is uploaded to SaaS application 102, proxy 104 intercepts the user data and obfuscates (e.g., via encryption or otherwise, etc.) any annotated user data before transmitting it to SaaS application 102. Proxy 104 then transmits the obfuscated user data to SaaS hosted application 102. One or more shared keys used for encrypting/decrypting (or obfuscating/un-obfuscating) user data may be stored in a protected storage on the user side of firewall 108 to prevent unauthorized users from directly accessing the shared keys. Access to the shared keys may be based on a mechanism similar to that used to authorize access to a lookup table 109 depicted in FIG. 1B and as further detailed below.

In another embodiment, rather than utilizing encryption, proxy 104 obfuscates the annotated user data by replacing the user data with unique identifiers. Proxy 104 correlates the unique identifiers with the annotated user data and then stores the correlated unique identifiers and annotated user data in a lookup table 109 as depicted in FIG. 1B. In this embodiment, instead of transmitting the annotated user data, proxy 104 transmits the corresponding unique identifiers to SaaS hosted application 102. SaaS hosted application 102 then stores the unique identifiers. Storing the annotated user data on the user side of the firewall 108 enhances security because only the user has access to the annotated data. Because only an identifier of the annotated user data is stored by the SaaS hosted application 102, the annotated user data is not accessible to anyone who gains access to remote server hosting the SaaS hosted application 102.

An exemplary lookup table 109 that may be utilized to unique identifiers as discussed above is illustrated in FIG. 1B. Lookup table 109 can be situated on the user side of firewall 108. Lookup table 109 includes a unique identifier field and a field for storing user data. A "flat" file and/or a database that is used to implement lookup table 109 should be sufficiently protected to prevent unauthorized users from directly accessing the lookup table. Lookup table 109 may include access control or authorization attributes to provide controlled access to the stored user data. In one embodiment, users of SaaS hosted application 102 may be authorized to access the stored user data (e.g., by providing authentication credentials to the plug-in in such user's browser 104, etc.) based on a role assignment. Alternatively, users may be authorized to access lookup table 109 (e.g., (e.g., by providing authentication credentials to the plug-in in such user's browser 104, etc.) based on the determination of corporate role and authorization servers such as corporate directories, authorization LDAP servers, etc. Lookup table 109 may be maintained in a flat file or in a database.

Returning to FIG. 1A, when the user requests data from SaaS hosted application 102, the data is transmitted from the SaaS hosted application 102 through the proxy 104. The proxy 104 analyzes the data for annotations and reverses the obfuscation process for all annotated user data. For example, proxy 104 will decrypt the annotated user data or replace the previously inserted unique identifiers with corresponding data from the lookup table 109. In one embodiment, if SaaS hosted application 102 is used by a plurality of end-users, proxy 104 may maintain an access control list (ACL) that designates which end-users are authorized to access to the annotated user data. When users access the annotated user data using SaaS hosted application 102, proxy 104 can consult the ACL to determine whether the end-user is authorized to access the data. If the proxy determines that the end-user is not authorized, it will send the obfuscated to the end-user.

As evident from the above embodiment, users of SaaS hosted application 102 control which portions of user data will be obfuscated. The process makes it possible to use SaaS hosted applications while maintaining sensitive user data locally, in one embodiment, maintaining obfuscated user data at a cloud data server associated with SaaS hosted application 102, in another embodiment, or a hybrid thereof, in a third embodiment. If the security and privacy of user data is paramount, in one embodiment, all sensitive user data can be stored locally and only unique identifiers of the locally stored user data are stored at SaaS hosted application 102.

Certain embodiments of the proxy approach illustrated in FIG. 1A may not be able to obfuscate the user data from certain types of SaaS hosted web applications. One example is a SaaS hosted web application built using Asynchronous JavaScript and XML (AJAX). Prior to the introduction of AJAX, a SaaS hosted application synchronously sent and received user data when an user explicitly submitted or requested a web page. In contrast, a SaaS hosted application implemented using AJAX can automatically and asynchronously send and receive user data in response to a user's key strokes or mouse actions. When SaaS hosted application 102 uses AJAX, or any other similar mechanism, to automatically transmit user data, it may be more difficult to configure proxy 104 to accurately capture the annotations and obfuscate the annotated user data or vice versa.

In scenarios where a SaaS application sends data automatically, proxy 104 may include a script to collect background transmission of the user data updates to SaaS application 102. For example, the script may include functionality to trap XMLHttpRequest objects and hold the updated user data until all annotation tags are received before submitting the updated data to SaaS application 102, after obfuscating the collected user data.

FIG. 2 illustrates a logical diagram of a system 100 of a different architecture for protecting confidential information that may be stored in SaaS application 102. In the embodiment of FIG. 2, the user interacts with a "virtual" browser 114 to access SaaS application 102. Virtual browser 114, in turn, is configured to communicate (as further discussed below) through a "management daemon" or firewall 110 to a "public" browser 112, which, in turn, interacts with SaaS application 102. The firewall 110 or management daemon facilitates communication between virtual browser 114 and public browser 112 and tracks or otherwise maintains two representations of the DOM of a web page being viewed by the user through virtual browser 114: (1) a DOM as maintained by virtual browser 114, and (2) a DOM as maintained by public browser 112. In one embodiment, virtual browser 114, the management daemon, and public browser 114 may all run on the same computer system (e.g., user laptop, desktop, tablet, etc.), although it should be recognized that these components may be run in separate computer systems in alternative embodiments.

It should be recognized that firewall 110 or management daemon may be implemented in a variety of ways, including, for example, writing a customized web browser from the ground up that functions as virtual browser 114 and includes a management daemon component that interacts with public browser 112, to running two different copies of an pre-existing web browser (e.g., virtual browser 114 and public browser 112) communicatively linked together by another running process, thread or operating system service that performs the functions of the management daemon (as further discussed below) to including the functions of the management daemon in a plug-in module to virtual browser 114. As further discussed herein, the management daemon or firewall 110 may further prevent some or all active code (e.g. JavaScript, Flash, Java Applets, etc.) from being passed from public browser 112 to virtual browser 114.

In the particular embodiment of FIG. 2, virtual browser 114 is a modified version of a commercially available Internet browser or a custom browser that provides similar functionality to commercially available browsers (e.g., Internet Explorer, Firefox, Chrome, etc.), although it should similarly be recognized that alternative embodiments may implement virtual browser 114 as a plug-in to public browser 112 or as a standalone desktop application that can be spawned automatically or manually when public browser 112 is used to visit the SaaS application 102. In the embodiment of FIG. 2, virtual browser 114 has been configured or otherwise modified to disable JavaScript, Java applets, Flash, plug-ins, controls and/or other similar extensions, rather than enable them, as in public browser 112. Embodiments of virtual browser 114 may also be further configured or modified to disable access to local storage, prevent network communication, and/ or prevent unmanaged modifications to the DOM used by virtual browser 114. Public browser 112 in FIG. 2 is also a commercially available browser (e.g., Firefox, Internet Explorer, Safari, Chrome, etc.), although it should be recognized that in alternative embodiments, any software that performs the functions of a browser can serve as a "public browser." In embodiments similar to FIG. 2, the settings or configurations of public browser 112 enable it to run JavaScript, Java applets, Flash, plug-ins, controls and/or other similar extensions. In certain embodiments, public browser 112 is modified or configured in a manner such that its user interface is suppressed or otherwise hidden from view (since the user does not need to utilize the user interface of public browser 112). Firewall 110 in the embodiment of FIG. 2 is a process or thread that communicates with both virtual browser 114 and public browser 112 in order to receive, transmit and manages changes to each of the browser's DOMs.

When the user interacts with virtual browser 114 for example, through keyboard, mouse or touchscreen interactions, to access SaaS application 102 in a manner similar to utilizing a typical browser, as previously discussed, in certain embodiments, the management daemon monitors and captures these user interaction events and passes them to public browser 112. The public browser 112, in turn, communicates with SaaS application 102 in accordance with the user interaction events and receives web page data from SaaS application 102 in response to the user interactions. The management daemon is notified of or otherwise obtains changes to the DOM of the public browser 112 as a result of the receipt of the web page data and subsequently passes such changes for the DOM of virtual browser 114. As further described below, in certain instances, the management daemon filters or otherwise changes the web page data in the DOM prior to passing it to virtual browser 114 for display to the user.

For example, in one embodiment, the user is able to interact with a web page as displayed on virtual browser 114 in order to tag, annotate or otherwise select user data for obfuscation. Embodiments of virtual browser 114 may be further configured to analyze displayed web pages and automatically tag text forms and fields (e.g., INPUT, TEXTAREA, SELECT and other similar HTML forms and fields, etc.) to obfuscate any user data that is entered into such forms and fields. Once such forms or fields are tagged, when the user enters data into a tagged field, for example, the management daemon, upon receiving notification that such data has been entered (e.g., the DOM of virtual browser has changed as a result of the user entering such data, etc.), encrypts or otherwise substitutes the entered text in the DOM with obfuscated data (e.g., using a persistent look-up table or database similar to the table in FIG. 1B) prior to forwarding the changes to the DOM to public browser 112. Similarly, when receiving encrypted or obfuscated user data in the DOM of public browser 112, the management daemon converts the user data into its original un-obfuscated form by decryption or other techniques such as utilizing a look-up table (as illustrated in FIG. 2, the text "5Gu899Sp02Z" in the public browser 112 is un-obfuscated into the text "James Bond").

In certain embodiments, the management daemon is further configured to filter other types of data before such data is transmitted to or from virtual browser 114. For example, while the management daemon may be configured to allow images and static HTML to pass between virtual browser 114 and public browser 112 unmodified, it may extract as pixels or bitmaps (or other forms of graphical updates) any regions in the DOM of public browser 112 that are associated with embedded applets (e.g., Java or Flash applets) and transmit such pixels or bitmaps to virtual browser 114 rather than permit virtual browser 114 to execute such embedded applets in order to maintain a level of security within virtual browser 114. Because public browser 112 maintains the integrity of the embedded applet in its DOM, when the management daemon passes user interaction events corresponding to such embedded applets from virtual browser 114 to public browser 112, the user is nevertheless able to interact with the embedded applets through virtual browser 114 even though virtual browser is not actually executing such embedded applets.

In one particular embodiment, the functionality of the public-virtual browser pair, as described above, is offered as a "vbrowser" service running on a server within an enterprise. The user may then use any commercial browser that is locally installed on the user's computer system and accesses vbrowser service through an embedded Java, Flash or similar applet or plug-in. The applet communicates with the virtual browser portion of the vbrowser service to render of web pages in the user's local browser and communicates user interaction events to the virtual browser portion of the vbrowser service, which, as previously discussed, propagates such events to the public browser portion of the vbrowser service.

Figure 3:
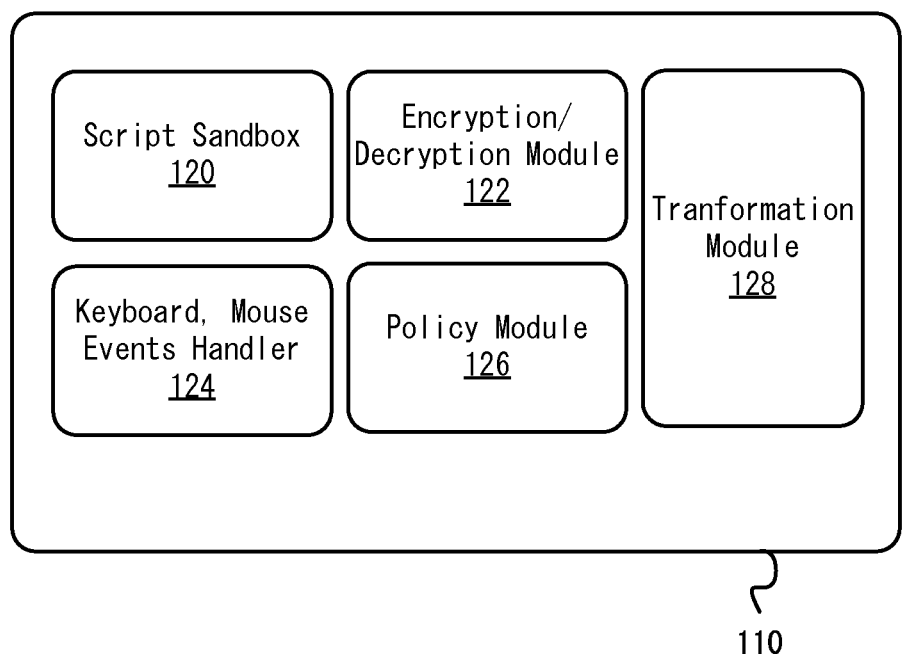
FIG. 3 illustrates a schematic diagram of a firewall in accordance with one or more embodiments.

FIG. 3 illustrates an exemplary diagram of a logical structure of the management daemon or firewall 110. Management daemon 110 may include a keyboard/mouse event handler module 124 that is notified by virtual browser 114 of user interaction events and forwards such events to public browser 112. In certain implementations, the keyboard/mouse event handler module 124 may include runtime functionality for custom event handlers, which may be used to process the keyboard/mouse events before these events are passed on to the public browser 112.

Management daemon 110 may also include a policy module 126 to enable selectively annotating the portions of the user data in virtual browser 112 based on a pre-defined rules or attributes. As discussed above, various authorization schemes may be incorporated in the process of annotating selected parts of the user data. Policy module 126 may also communicate with corporate policy, role or authorization servers and to enforce data obfuscation and authorization policies according to selected corporate policies. For example and as previously discussed, an obfuscation policy may mandate that all INPUT, TEXTAREA and SELECT display elements will be marked secure and data entered in these fields will be automatically obfuscated. The obfuscation policy may also include that display elements with particular names or names with selected prefixes/suffixes shall be automatically marked secure. For example, display or DOM elements with the name prefix "secure" may be automatically obfuscated. In another example, as previously discussed, management daemon 110 may extract a list of DOM elements from the web pages of SaaS application 102 and the policy module may be configured to automatically obfuscate selected DOM elements. Policy module 126 may also store settings, which determine whether a selected DOM or display element is to be encrypted or replaced by a unique identifier.

A script sandbox module 120 may also be included in management daemon 110 to provide a runtime environment for running scripts in virtual browser 114 to prevent any scripts embedded in the web pages of SaaS application 102 from transmitting the updates in DOM at virtual browser 114 side without first being obfuscated by management daemon, if desired. Management daemon 110 may also be configured to prevent unmanaged communication of the embedded script in the web pages with external ports.

Management daemon 110 may also include an encryption/decryption module 122 to provide data obfuscation functionality. Encryption/decryption module 122 may communicate with a lookup table 109 to store mappings of secure user data and corresponding unique identifiers. As noted above, the obfuscation may include either encrypting a data with encryption keys or replacing the data with a unique identifier and storing the data and the unique identifier in the lookup table. In certain embodiments, a user may employ any or both of the two obfuscation methods. For example, the user may encrypt some data and may replace the other data using unique identifiers. The lookup table stores these unique identifiers and the corresponding user data. During a page load in virtual browser 114, the management daemon may replace the unique identifiers with corresponding user data through a lookup in the lookup table and other encrypted data, if any, is decrypted. Of course, if authorization and roles management is employed, as noted above, user authorizations and roles are considered before un-obfuscating the obfuscated user data. Encryption/decryption, in one embodiment, may be accomplished using a symmetrical shared key. Access to the shared key may be based on corporate authorization schemes to limit access to secret information to only authorized personnel in the corporation. Different shared keys may be used for encrypting different parts of user data, each accessible to a user based on corporate authorization and role management schemes (if such schemes are employed). Other industry standard encryption/decryption mechanisms may also be employed in other embodiments. For example, asymmetrical keys may be used in some embodiments.

Figure 4A:
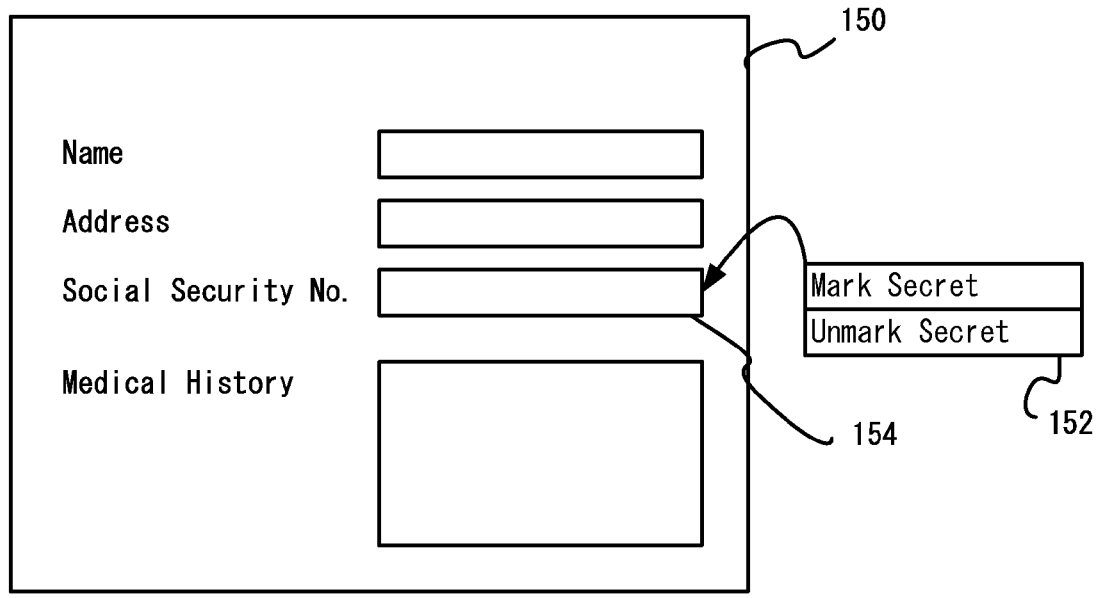
FIGS. 4A-4B illustrate an example of marking user data secure in accordance with one or more embodiments.
Figure 4B:
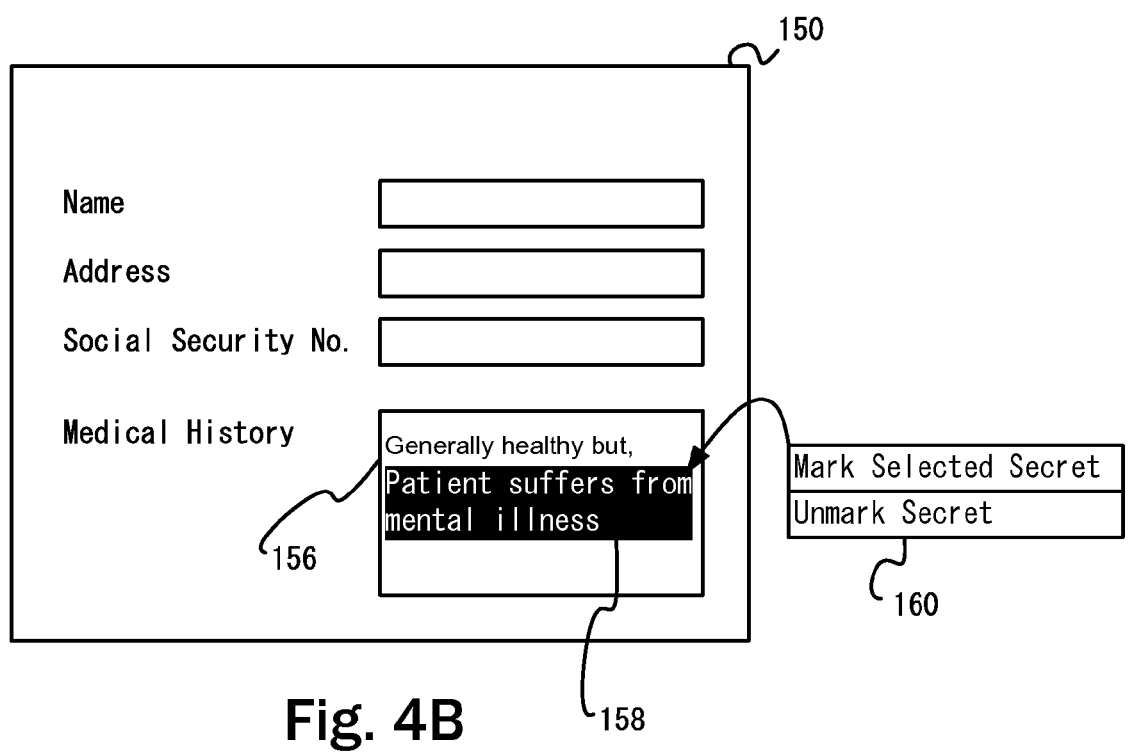

FIGS. 4A and 4B illustrate an exemplary user interface 150 to demonstrate the marking and unmarking operations noted above. Virtual browser 114 includes a plug-in to provide context menus 152 to enable a user to select/unselect desired user data for the purpose of making a selected user data confidential. The user may employ context menus 152 to mark or unmark a user interface element 154. When the user enters or updates user data in the user interface element 154, virtual browser 114 annotates the entered/updated data and the management daemon 110 obfuscates the annotated user data before forwarding it to public browser 112 to further forward to SaaS application 102.

Figure 5:
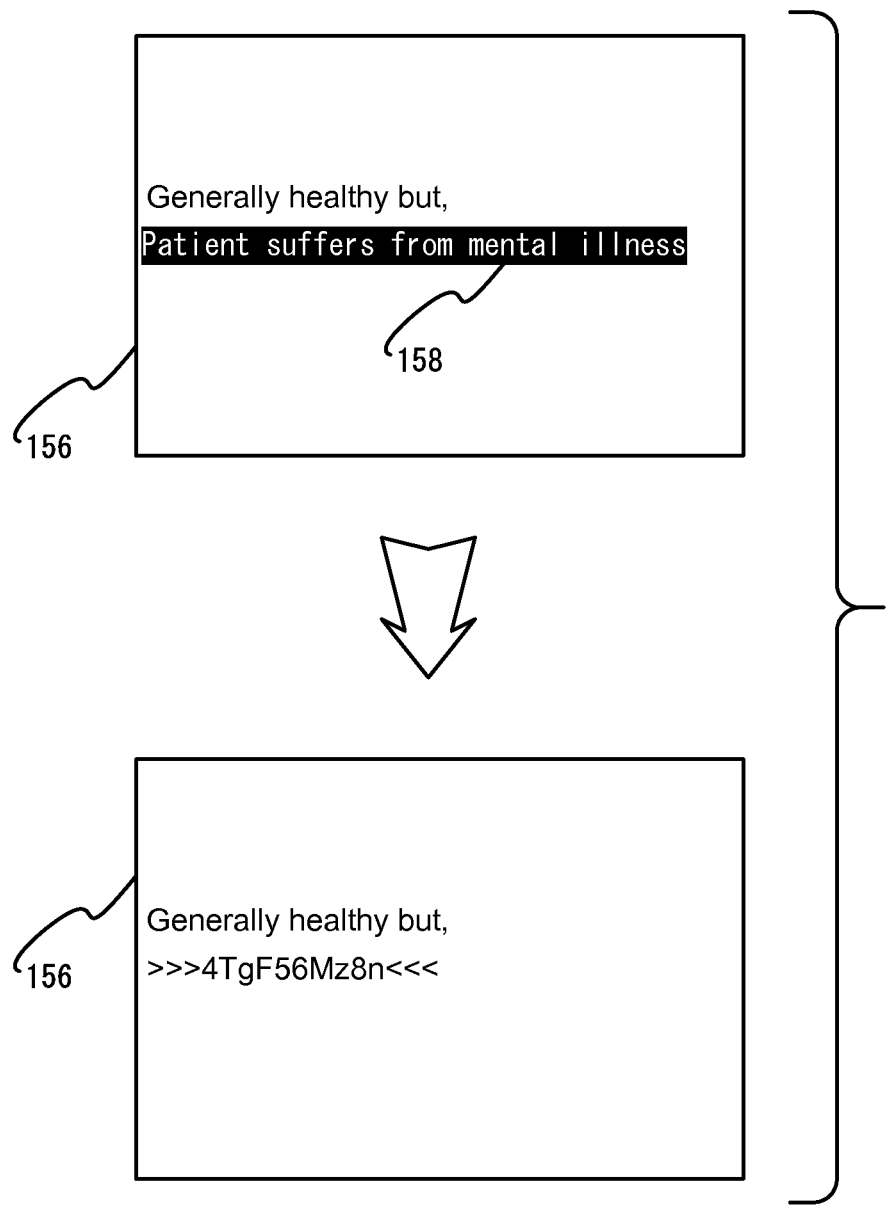
FIG. 5 illustrates an example of selectively encrypting user data in accordance with one or more embodiments.

In another embodiment, as shown in FIG. 4B, the user (or an IT administrator) may select a part of user data 158 in a user interface element 156 using a context menu 160. In this embodiment, the plug-in only annotates the selected user data for obfuscation. In this embodiment, as shown in FIG. 5, management daemon 110 only obfuscates the selected parts of the user data as displayed in the user interface. Different types of annotation symbols may be used for indicating different type of data conversions. For example, one type of annotation symbols may be used to identify encrypted data and a different symbol may be to identify unique identifiers. Alternatively, management daemon 110 may first perform a lookup to in the lookup table to determine if the selected data 158 is encrypted data or a unique identifier.

In one embodiment, if the user (or IT administrator) tags a file upload DOM element within a web form for obfuscation, management daemon 110 obfuscates the file (e.g., a picture, a document, etc.) prior to providing it to public browser 112 which would upload it to SaaS application 102 (or an associated data/file server). Alternatively, management daemon 110 may store the file to be uploaded locally and provide a dummy file with a unique identifier (to identify the locally stored copy of the file) to the DOM of public browser 112 to upload to SaaS application 102. In other embodiments, the user may replace sensitive data in the file to be uploaded with unique identifiers or may encrypt the sensitive information. If management daemon 110 provides a dummy file to the DOM of public browser 112 to upload to SaaS application 102, the dummy file may have the same extensions and/or signatures as the original file. In some embodiments, a dummy image file may have the same dimensions as the original image but the content of the dummy image file may be replaced by dummy pixels. Similarly, management daemon 110 may obfuscate web links containing user input prior to forwarding them to public browser 112 to provide to SaaS application 102.

Figure 6A:
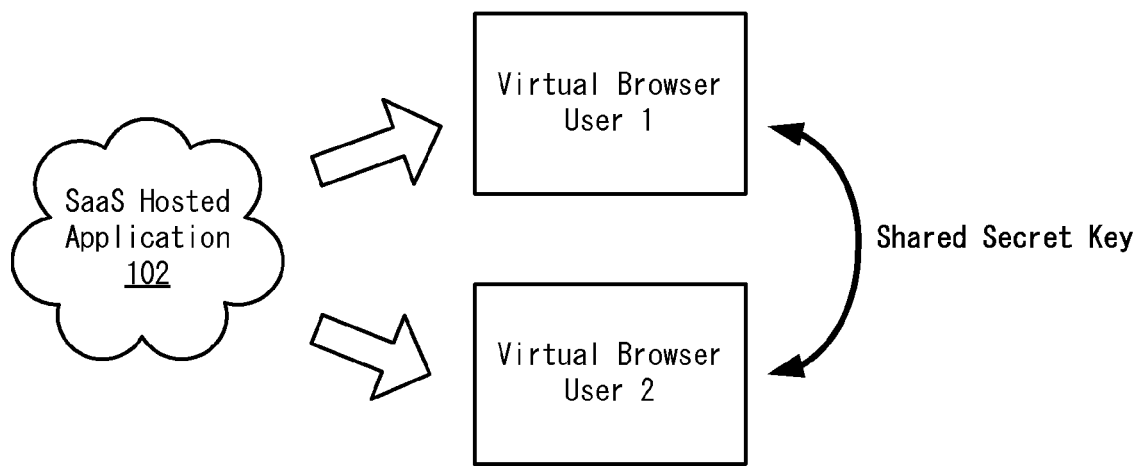
FIGS. 6A-6B illustrate an example of sharing secured user data among multiple users in accordance with one or more embodiments.

If management daemon 110 uses encryption to obfuscate confidential user data, it may use an encryption mechanism that employs a secret key. A plurality of users may wish to use the same secret key. FIG. 6A illustrates sharing of the secret key among different users. In some embodiments, the shared key may be stored in a secure location, which is accessible to the plurality of users, who are authorized to view the secret data. Other embodiments may employ access control incorporating authorization policies to provide access to shared keys according to the user's authorization roles.

Figure 6B:
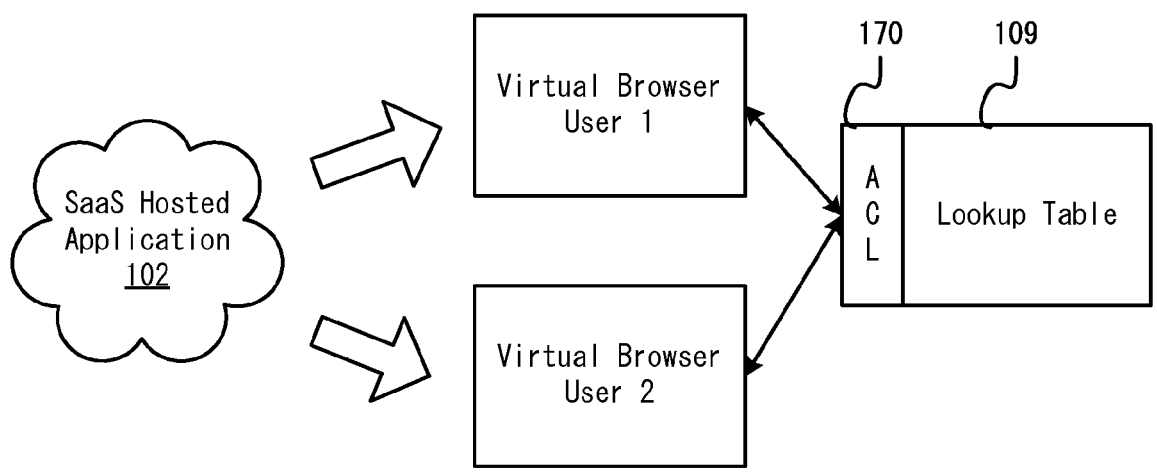

FIG. 6B illustrates local data storage without encryption. In this embodiment, SaaS application 102 provides the business functionality on locally stored data. In this embodiment, the annotated user data is replaced by unique identifiers and the replaced text is stored locally in the lookup table 109. Access to the lookup table 109 may be based on access control list 170 or based on corporation authorization policies. As noted above, a user may decide to store some data locally and encrypt the other data (and store in SaaS application 102). A hybrid of the above two schemes may also be employed.

In an exemplary embodiment, the SaaS hosted application 102 provides obfuscation awareness support. In one example, the SaaS hosted application 102 provides programming hooks for managing obfuscation of display or DOM elements. For example, the SaaS hosted application 102 may provide support for naming DOM elements in a selected manner to enable easy obfuscation of DOM elements. In one example, an author of the SaaS hosted application 102 may use a predefined name prefix or suffix (or some other identification) for selected DOM elements. Alternatively, the SaaS hosted application 102 may have a different set of DOM elements that may be used by SaaS application authors to provide native support for data obfuscation.

With the above embodiments in mind, it should be understood that the invention can employ various computer-implemented operations involving data stored in computer systems. These operations are those requiring physical manipulation of physical quantities. Any of the operations described herein that form part of the invention are useful machine operations. The invention also relates to a device or an apparatus for performing these operations. In one embodiment, the apparatus can be specially constructed for the required purpose (e.g. a special purpose machine), or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The embodiments of the present invention can also be defined as a machine that transforms data from one state to another state. The transformed data can be saved to storage and then manipulated by a processor. The processor thus transforms the data from one thing to another. Still further, the methods can be processed by one or more machines or processors that can be connected over a network. The machines can also be virtualized to provide physical access to storage and processing power to one or more users, servers, or clients. Thus, the virtualized system should be considered a machine that can operate as one or more general purpose machines or be configured as a special purpose machine. Each machine, or virtual representation of a machine, can transform data from one state or thing to another, and can also process data, save data to storage, display the result, or communicate the result to another machine.

The programming instructions and modules can also be embodied as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible/non-transitory medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overall operations are performed in the desired way.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A computer implemented method, comprising:
   receiving web page data from a remote web-based application to a browser for display to a user, the browser having a plug-in installed thereon;
   annotating at least a portion of the web page data to indicate that the portion of the web page data is confidential, the annotating performed by the plug-in installed on the browser based on input from the user;
   receiving the web page data to a proxy server;
   obfuscating the annotated portion of the web page data by the proxy server; and
   transmitting the obfuscated portion of the web page data and the un-obfuscated portion of the web page data that was not annotated to the remote web-based application.

2. The method of claim 1, wherein obfuscating the annotated portion of the web page data further comprises:
   replacing the annotated portion of the web page data with a unique identifier prior to transmitting the web page data to the remote web based application; and
   storing a mapping between the unique identifier and the annotated portion of the web page data by the proxy server.

3. The method of claim 1, wherein obfuscating the annotated portion of the web page data further comprises:
   encrypting the annotated portion of the web page data using a key, wherein the web page data transmitted to the remote web-based application contains the encrypted portion of the web page data; and
   storing the key in protected storage by the proxy server.

4. The method of claim 1, wherein the plug-in adds one or more tags to the annotated portion of the web page data, wherein the one or more tags appear as parts of the web page data to the remote web-based application.

5. The method of claim 1, wherein the browser and the proxy server reside inside of a user side of a firewall while the remote web-based application resides outside of the firewall.

6. The method of claim 1, wherein the proxy server maintains an access control list (ACL) that designates which users are authorized to access the annotated portion of the web page data.

7. The method of claim 1, wherein the proxy server includes a script configured to collect background transmission of user data updates to the remote web-based application and hold the collected user data until the portion of the web page data has been obfuscated.

8. The method of claim 1, wherein the proxy server is further configured to receive the obfuscated portion of the web page from the remote web-based application, un-obfuscate the obfuscated portion of the web page and provide the un-obfuscated portion to the browser.

9. A computer implemented method, comprising:
   detecting, by a management component, a request to load a web page of a remote web-based application in a virtual browser that is used by a user;
   causing the web page to be loaded in a public browser, the web page including web page data corresponding to the request to the load the web page received from the remote web-based application;
   determining that the web page data loaded to the public browser includes data that has been previously obfuscated by the management component, wherein the management component is a daemon configured to communicate updates to the document object models (DOMs) of both the public web browser and the virtual web browser;
   un-obfuscating the obfuscated data by the management component; and
   substituting the un-obfuscated data for the obfuscated data in the web page data; and
   forwarding the web page data to the virtual browser for display to the user after the un-obfuscated data is substituted for the obfuscated data.

10. A computer implemented method, comprising:
    detecting, by a management component, a request to load a web page of a remote web-based application in a virtual browser that is used by a user;
    causing the web page to be loaded in a public browser, the web page including web page data corresponding to the request to the load the web page received from the remote web-based application;
    determining that the web page data loaded to the public browser includes data that has been previously obfuscated by the management component;
    un-obfuscating the obfuscated data by the management component, wherein un-obfuscating the obfuscated data further comprises replacing a unique identifier with a portion of user input data based on persistently stored mapping in a data structure accessible by the management component; and
    substituting the un-obfuscated data for the obfuscated data in the web page data; and
    forwarding the web page data to the virtual browser for display to the user after the un-obfuscated data is substituted for the obfuscated data.

11. The method of claim 9, wherein the step of un-obfuscating further comprises decrypting an encrypted portion of the web page data based on a key stored in protected storage accessible by the management component.

12. A computer implemented method, comprising:
    detecting, by a management component, a request to load a web page of a remote web-based application in a virtual browser that is used by a user;
    causing the web page to be loaded in a public browser, the web page including web page data corresponding to the request to the load the web page received from the remote web-based application, wherein the virtual browser is configured to prevent execution of third party runtime components and the public browser is configured to allow execution of third party runtime components;
    determining that the web page data loaded to the public browser includes data that has been previously obfuscated by the management component;
    un-obfuscating the obfuscated data by the management component; and
    substituting the un-obfuscated data for the obfuscated data in the web page data; and
forwarding the web page data to the virtual browser for display to the user after the un-obfuscated data is substituted for the obfuscated data.

13. A non-transitory computer readable storage medium containing a set of instructions that when executed by one or more processors of a computer, cause the computer to perform a set of operations, comprising:
    receiving web page data from a remote web-based application to a browser for display to a user, the browser having a plug-in installed thereon;
    annotating at least a portion of the web page data to indicate that the portion of the web page data is confidential, the annotating performed by the plug-in installed on the browser based on input from the user;
    receiving the web page data to a proxy server;
    obfuscating the annotated portion of the web page data by the proxy server; and
    transmitting the obfuscated portion of the web page data and the un-obfuscated portion of the web page data that was not annotated to the remote web-based application.

14. The non-transitory computer readable storage medium of claim 13, wherein obfuscating the annotated portion of the web page data further comprises:
    replacing the annotated portion of the web page data with a unique identifier prior to transmitting the web page data to the remote web based application; and
    storing a mapping between the unique identifier and the annotated portion of the web page data by the proxy server.

15. The non-transitory computer readable storage medium of claim 13, wherein obfuscating the annotated portion of the web page data further comprises:
    encrypting the annotated portion of the web page data using a key, wherein the web page data transmitted to the remote web-based application contains the encrypted portion of the web page data; and
    storing the key in protected storage by the proxy server.

16. The non-transitory computer readable storage medium of claim 13, wherein the plug-in adds one or more tags to the annotated portion of the web page data, wherein the one or more tags appear as parts of the web page data to the remote web-based application.

17. The non-transitory computer readable storage medium of claim 13, wherein the browser and the proxy server reside inside of a user side of a firewall while the remote web-based application resides outside of the firewall.

18. The non-transitory computer readable storage medium of claim 13, wherein the proxy server maintains an access control list (ACL) that designates which users are authorized to access the annotated portion of the web page data.

19. The non-transitory computer readable storage medium of claim 13, wherein the proxy server includes a script configured to collect background transmission of user data updates to the remote web-based application and hold the collected user data until the portion of the web page data has been obfuscated.

* * * * *